(12) United States Patent
Tsirkin (10) Patent No.: US 10,936,728 B2
(45) Date of Patent: Mar. 2, 2021

(54) NON-PERSISTENT MODE FOR NETWORK CONNECTION

(71) Applicant: Red Hat, Inc., Raleigh, NC (US)

(72) Inventor: Michael Tsirkin, Yokneam Yillit (IL)

(73) Assignee: Red Hat, Inc., Raleigh, NC (US)

( * ) Notice: Subject to any disclaimer, the term of this patent is extended or adjusted under 35 U.S.C. 154(b) by 408 days.

(21) Appl. No.: 15/440,865

(22) Filed: Feb. 23, 2017

(65) Prior Publication Data
US 2018/0239908 A1 Aug. 23, 2018

(51) Int. Cl.
*G06F 21/60* (2013.01)
*H04L 29/06* (2006.01)
*G06F 21/62* (2013.01)

(52) U.S. Cl.
CPC .......... *G06F 21/60* (2013.01); *G06F 21/6263* (2013.01); *H04L 63/083* (2013.01); *H04L 63/107* (2013.01); *G06F 2221/2143* (2013.01); *H04L 2463/121* (2013.01)

(58) Field of Classification Search
CPC ................. G06F 21/60; G06F 21/6263; G06F 2221/2143; H04L 63/083; H04L 2463/121; H04L 63/107
USPC ............................................................ 726/4
See application file for complete search history.

(56) References Cited

U.S. PATENT DOCUMENTS

| 7,185,204 | B2 | 2/2007 | Narayanaswami et al. | |
|---|---|---|---|---|
| 8,510,858 | B2 * | 8/2013 | Lee | H04N 1/4413 726/29 |
| 9,369,874 | B2 | 6/2016 | Otiato et al. | |
| 2006/0114863 | A1 * | 6/2006 | Sanzgiri | H04W 12/1202 370/338 |
| 2006/0236384 | A1 * | 10/2006 | Lindholm | H04L 9/3226 726/10 |
| 2006/0253586 | A1 * | 11/2006 | Woods | G06F 16/9535 709/226 |

(Continued)

FOREIGN PATENT DOCUMENTS

| CN | 101616495 | 12/2009 |
|---|---|---|
| CN | 101867650 | 10/2010 |

(Continued)

OTHER PUBLICATIONS https://content.safervpn.com/blog/how-to-create-virtual-wifi/, The Ultimate Guide to Creating a Virtual WiFi, Mar. 13, 2015, 8 pages.

*Primary Examiner* — Maung T Lwin
*Assistant Examiner* — Sanchit K Sarker
(74) *Attorney, Agent, or Firm* — Lowenstein Sandler LLP (57) ABSTRACT

Systems and methods for enhanced network connection privacy. An example method may comprise: receiving a selection to activate a non-persistent mode for a network manager of a client device, the non-persistent mode preventing tracking of network locations accessed by the client device; activating the non-persistent mode for the network manager; and while the non-persistent mode is activated for the network manager: receiving a request to connect to a network; and performing, via the network manager, a set of operations to establish a connection with the network, the set of operations excluding storing information revealing the network connection in persistent memory of the client device.

18 Claims, 6 Drawing Sheets

(56) References Cited

U.S. PATENT DOCUMENTS

| | | | | |
|---|---|---|---|---|
| 2008/0165738 A1* | 7/2008 | Barber | ................. | H04W 48/18 |
| | | | | 370/331 |
| 2014/0362293 A1* | 12/2014 | Bakar | .................... | H04N 21/47 |
| | | | | 348/552 |
| 2014/0366156 A1* | 12/2014 | Liu | ......................... | G06F 21/60 |
| | | | | 726/27 |
| 2016/0029218 A1 | 1/2016 | Otiato et al. | | |

FOREIGN PATENT DOCUMENTS

| | | | | |
|---|---|---|---|---|
| CN | 103795847 | | 5/2014 | |
| CN | 104618382 | * | 5/2015 | ............. H04L 29/06 |
| CN | 102902914 | | 6/2015 | |
| WO | WO2016109816 | | 7/2017 | |

* cited by examiner

NON-PERSISTENT MODE FOR NETWORK CONNECTION

TECHNICAL FIELD

The present disclosure is generally related to networking, and is more specifically related to enhancing privacy related to networking by enabling a non-persistent mode for various devices.

BACKGROUND

Computing devices with network connectivity enabled may cause a network manager of the computing devices to search for available networks. Once a desired available network is found, the user may select to connect the computing device to the network. Such searching and connecting may leave trace information of the available networks on the computing device. The trace information may include addresses of the networks, geographical location information of the computing device and/or networks, timestamps of connectivity, user/name and password information of accounts linked with the networks, and the like. In some cases, the trace information may be used in ways that cause privacy concerns to the users of the computing devices. For example, the geographical location and timestamp information may be used to pinpoint where the computing device has physically been and during what timeframe, which may be undesirable to some users.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Maintaining one's privacy in the technology world is a concern for many users of computing devices (e.g., laptop, tablet, smartphone, etc.). For example, some high-level computing privacy issues may include the sharing of personal information on a social media network to third parties or website visitation tracking on an Internet browser. Additionally, a lower-level computing privacy issue may include the information that is available in a system log or a network manager of a computing device. The information stored in the system log and/or network manager may include the addresses of networks that are found when network (e.g., wireless) connectivity is enabled on a network interface controller (NIC) of the computing device, geographical location information of the networks, and/or credentials to connect to the networks. To protect one's privacy, a user may attempt manual methods such as erasing the system log or disabling network connectivity altogether. However, these methods are inadequate because the user may forget to delete the system log and cannot access networks using the computing device when network connectivity is disabled.

Aspects of the present disclosure address the above and other deficiencies by providing a non-persistent mode for a network manager of a client device to protect the privacy of information related to the client device. In an example, activation of the non-persistent mode on the client device causes certain operations to be performed to prevent information revealing the network connection from being stored on the client device.

For example, upon activation of the non-persistent mode of the network manager, any information revealing a connection with the network may not be stored in persistent memory on the client device when performing a set of operations to establish the connection. Also, in an example, logging of network connection events may be disabled. The set of operations to establish the connection may include searching for a list of available networks in an area where the client device is physically located, connecting to a selected network using a connection password, and authenticating the client device with the selected network using the connection password, among others. The information revealing the network connection may include the list of available networks, addresses of the available networks, connection passwords for selected networks, geographical information of the client device and/or found networks, or some combination thereof. In an example, the user may activate the non-persistent mode prior to enabling network connectivity of the client device, prior to scanning for available networks in the vicinity, prior to connecting to a discovered network, or the like.

Further, in an example, when the non-persistent mode is activated, a processing device of the client device may present various options to the user via a network manager user interface. The options may include an option to store the information revealing the network connection in non-persistent memory (e.g., random access memory (RAM)) and an option to delete the information revealing the network connection without storing it to any memory. If the user selects to store the information revealing the network connection in non-persistent memory, the information may be stored in non-persistent memory of the client device until a certain event occurs. For example, the event may include rebooting the client device, locking an operating system of the client device, completing authentication of the client device with the network, deactivating the non-persistent mode, logging off the operating system, switching users of the operating system, and the like. Further, if the connection is dropped, the password and selected network may be retrieved from the non-persistent memory and used to reestablish the connection.

Benefits of the disclosed techniques may include preventing a client device from being tracked at certain times or locations by not leaving permanent traces of network activity on the client device. As a result, a user of the client device no longer needs to manually erase the system log or disable network connectivity, and protection of the user's privacy is significantly improved. Various aspects of the above referenced methods and systems are described in details herein below by way of examples, rather than by way of limitation.

Figure 1:
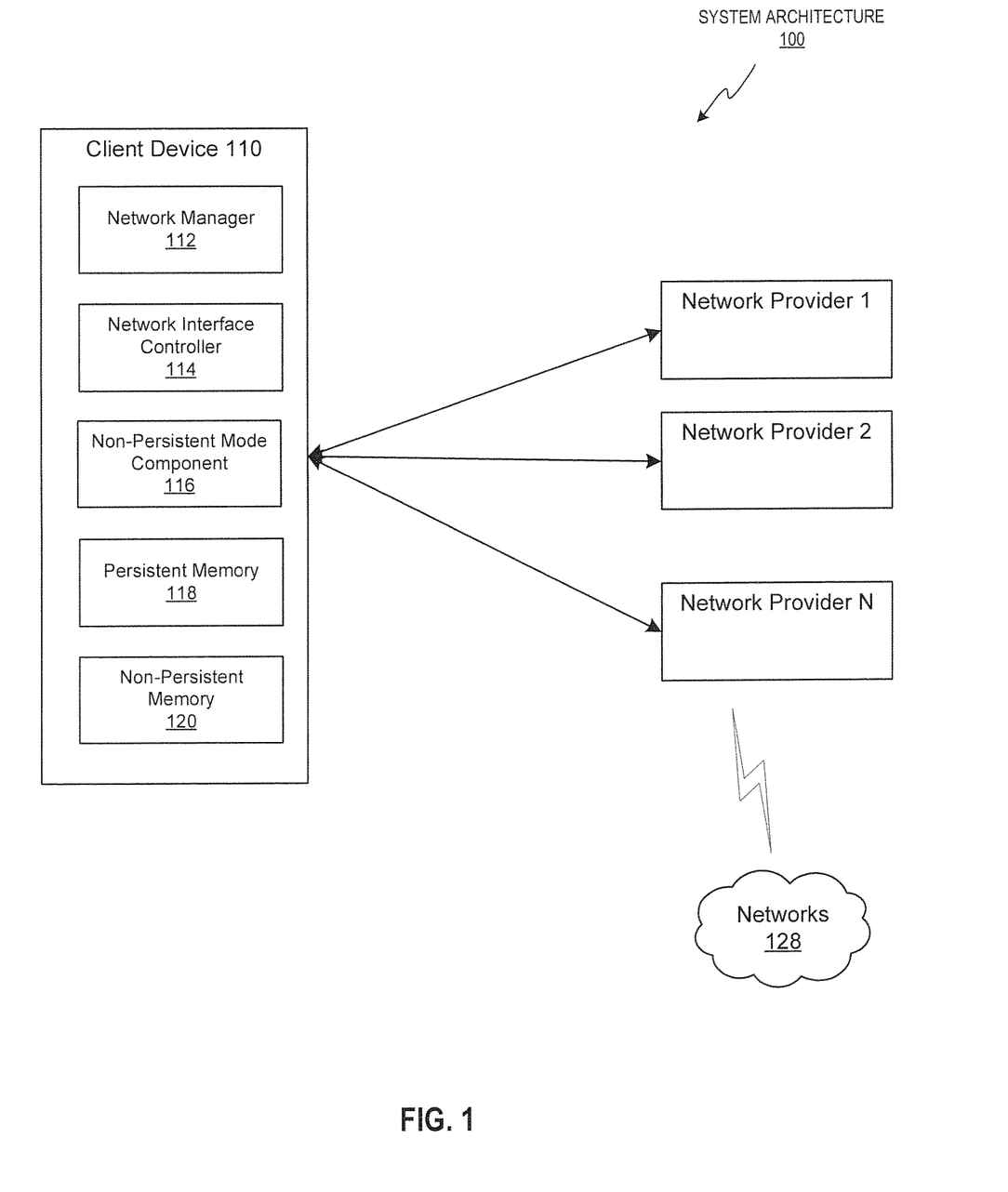
FIG. 1 depicts a high-level diagram of an example system architecture operating in accordance with one or more aspects of the present disclosure.

FIG. 1 depicts a high-level diagram of an example system architecture 100 operating in accordance with one or more aspects of the present disclosure. It should be noted that other architectures are possible (e.g., system architecture 200 illustrated in FIG. 2), and that the implementation of a system utilizing embodiments of the disclosure are not necessarily limited to the specific architecture depicted. The system architecture 100 may include a client device 110 in communication with one or more network providers 1, 2, and N to access one or more networks 128. The client device 110 may include any suitable computing device, such as a laptop, tablet, smartphone, personal digital assistant (PDA), desktop, server, or other portable or non-portable devices. The client device 110 interacts with the network providers 1, 2, and N by exchanging messages via one or more communication protocols.

The network providers 1, 2, and/or N may include telecommunication companies, data carriers, wireless communication providers, Internet service providers, and/or cable television providers offering Internet access. Further, the networks 128 may be provided by the network providers 1, 2, and N and may be a public network (e.g., the Internet), a private network (e.g., a local area network (LAN), a wide area network (WAN)), or a combination thereof. Networks 128 may include a wireless infrastructure, such as a wireless fidelity (WiFi) hotspot connected with the networks 128 and/or a wireless carrier system that can be implemented using various data processing equipment, communication towers, etc. In some embodiments, the networks 128 may include a wired infrastructure, such as Ethernet that enables direct access to the networks 128, provided by the network providers 1, 2, and N.

The client device 110 may include a network manager 112, a network interface controller (NIC) 114, a non-persistent mode component 116, a persistent memory 118, a non-persistent memory 120, and one or more processors communicatively coupled to memory devices (e.g., persistent memory 118, non-persistent memory 120) and input/output (I/O) devices, as described in more details herein below with references to FIG. 6. The non-persistent memory 120 may include any suitable type of volatile memory, such as random-access memory (RAM), dynamic random-access memory (DRAM), static random-access memory (SRAM), and the like. The persistent memory 118 may include any suitable type of non-volatile memory, such as hard disk drive, read-only memory (ROM), optical disc drive, magnetic tape, flash memory, solid-state storage, and the like.

The network manager 112 may refer to a component (e.g., a computer program or module) that may be included with an operating system of the client device 110, or be an independent application or module running on top of the operating system of the client device 110, and may provide a high-level interface for controlling the NIC 114. For example, device drivers for the NIC 114 may be part of the operating system kernel and the network manager 112 may be used to configure addresses and other characteristics of the NIC 114 by using the device drivers. The NIC 114 may include circuitry that enables communicating using a specific physical layer and data link layer standard such as Ethernet, Fibre Channel, WiFi, and the like. Thus, the NIC 114 enables the client device 110 to communicate over the networks 128 (e.g., wired or wirelessly).

The network manager 112 may perform operations to establish a connection with one of the networks 128. The activities may include searching for a list of available networks 128 in an area where the client device 110 is physically located, connecting to a selected network 128 using a connection password, and authenticating the client device 110 with the selected network 128 using the connection password, among others. The information obtained during the network connection activity is stored in the persistent memory 118 when the network manager 112 is operating in the persistent mode rather than the non-persistent mode, which may be undesirable to the user from a privacy perspective as discussed in greater detail above. The persistent mode refers to the network manager 112 storing the information obtained during the network connection activity in the persistent memory 118. The non-persistent mode refers to the network manager 112 not storing the information obtained during the network connection activity in the persistent memory 118. In some examples, the non-persistent mode may include storing the information obtained during the network connection activity in the non-persistent memory 120 or not storing the information in any memory For example, a user may instruct the client device 110 to connect to one of the networks 128 (e.g., the Internet) to check email, surf the web, send text message, stream videos, or the like. As described above, without using the non-persistent mode for the network manager 112 described herein, a user may access one of the networks 128 provided by the network providers 1, 2, or N and information revealing the network connection may be stored in the persistent memory 118 of the client device 110. This may enable another entity (e.g., a person who has gained access to the client device 110 without user authorization) to track where the client device 110, and thus the user, has physically been and/or what time the user was at the physical location because of geographical information and/or timestamp information related to the accessed network 128 stored in the persistent memory 118.

However, using the presently disclosed technology, the user may protect their privacy by activating the non-persistent mode to ensure that information revealing the network connection is not stored in the persistent memory 118 of the client device 110. In an example, the user may select to activate the non-persistent mode for the network manager 112. The non-persistent mode component 116 may include instructions stored in memory that, when executed by a processing device, cause the processing device to activate the non-persistent mode for the network manager 112 and perform operations to ensure that information revealing the network connection are not stored in the persistent memory 118. In some examples, the non-persistent mode component 116 may be a standalone application that interfaces with the network manager 112 or may be a component of the network manager 112.

In some instances, the user may select to activate the non-persistent mode prior to connecting to a selected network 128, and even prior to the network manager 112 scanning for the available networks 128. For example, the user may select to activate the non-persistent mode while network (e.g., wireless) connectivity is still disabled. Activating the non-persistent mode early may ensure that any information revealing a network connection is not stored in the persistent memory 118 at a particular time and/or while the user is at a certain physical location.

Figure 2:
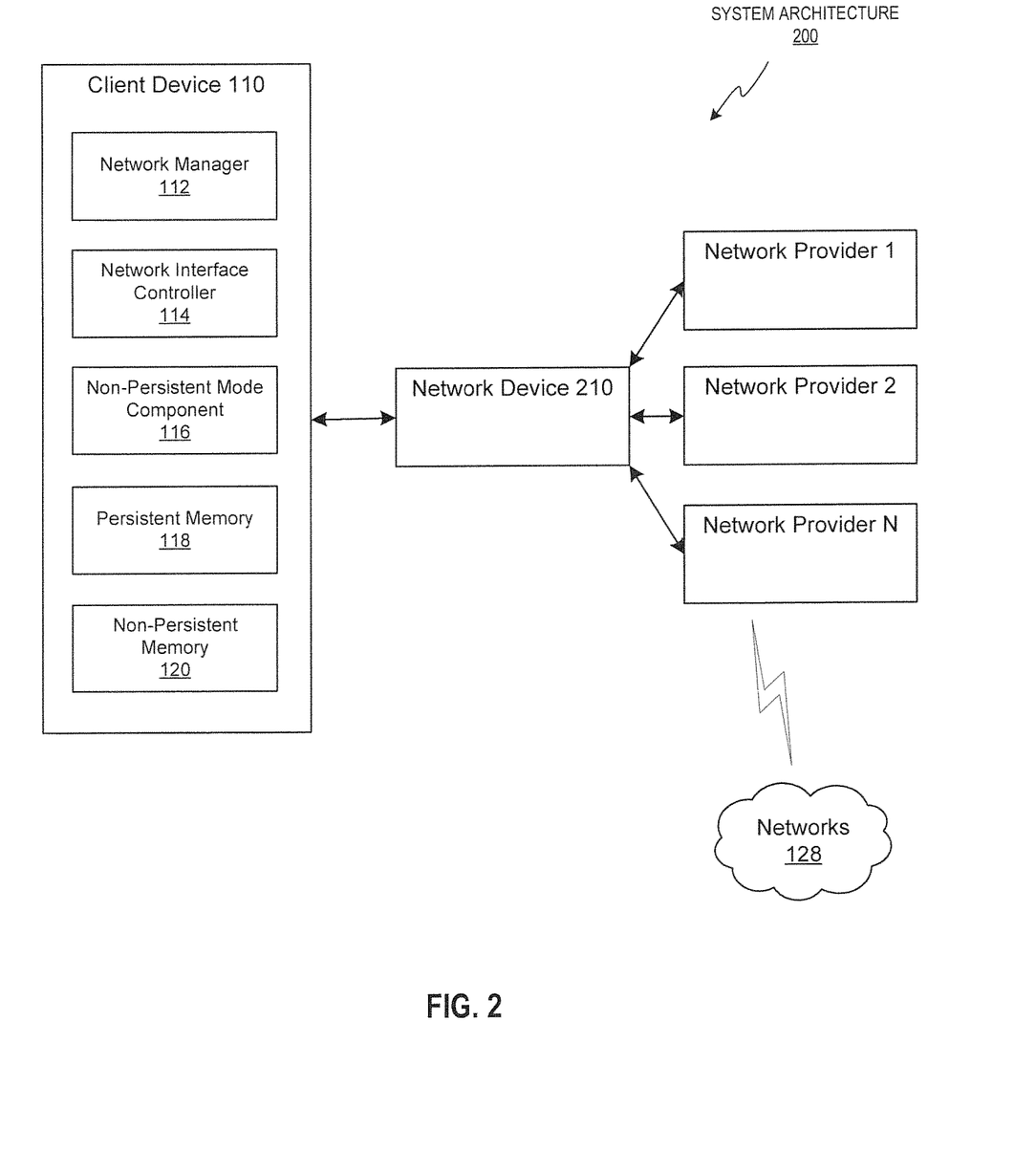
FIG. 2 depicts a high-level diagram of another example system architecture operating in accordance with one or more aspects of the present disclosure.

FIG. 2 depicts a high-level diagram of another example system architecture 200 operating in accordance with one or more aspects of the present disclosure. As depicted, in addition to the client device 110, the network providers 1, 2, and N, the system architecture 200 also includes a network device 210. The client device 110 may be communicatively coupled, either wired or wirelessly, to the network device 210. The network device 210 may include one or more machines including one or more routers, wireless access point, repeaters, hubs, switches, bridges, gateways, modems, servers, and the like. The network device 210 may function to relay data between the client device 110 and the networks 128 provided by the network providers 1, 2, and N. For example, the network device 210 may be a router that forwards data packets between nodes in one or more of the networks 128 provided by the network providers 1, 2, and N until the data packet reaches a destination node.

In an example, the router may be connected to one of the network providers 1, 2, and N, which may include internet service providers, and the router may provide a wireless local area network (WLAN) that functions as a "hotspot." Hotspot may refer to a physical location where people obtain Internet access. The client device 110 may access the wireless connection (e.g., WiFi) provided by the hotspot. However, unless the client device 110 is operating in the non-persistent mode of the present disclosure, connecting to the hotspot may cause certain information related to the connection to be stored in the persistent memory 118. The information may include geographical information of the physical location of the hotspot, network name, network address, timestamp of when the network connection is established, and so forth. Accordingly, as described herein, the user may activate the non-persistent mode for the client device 110 prior to connecting or searching for the hotspot provided by the network device 210 to ensure that information revealing the network connection is not stored in the persistent memory 118.

Figure 3:
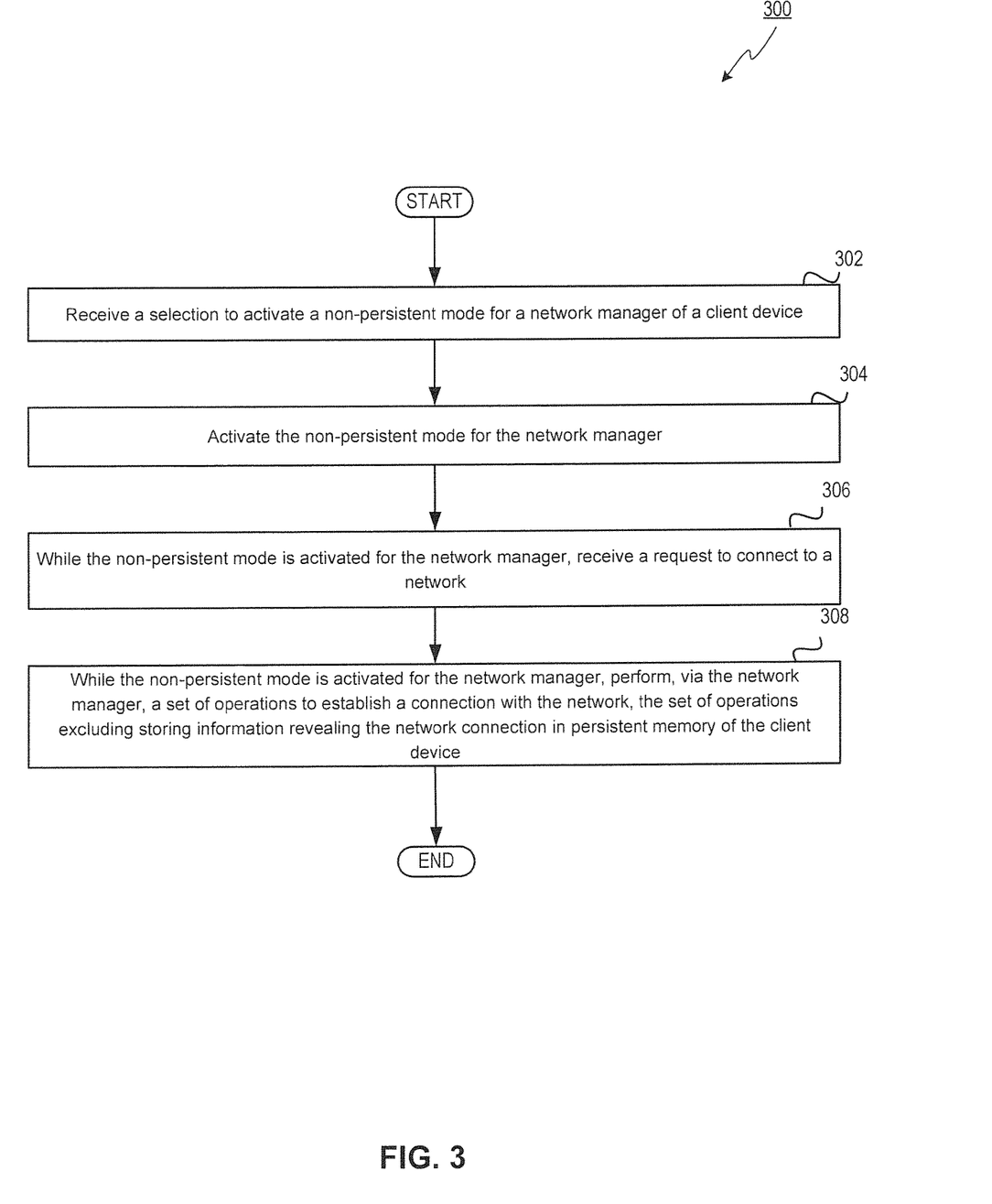
FIG. 3 depicts a flow diagram of an example method for activating a non-persistent mode for a network manager that enhances privacy for network connections, in accordance with one or more aspects of the present disclosure.

FIG. 3 depicts a flow diagram of an example method 300 for activating a non-persistent mode for the network manager 112 that enhances privacy for network connections, in accordance with one or more aspects of the present disclosure. Method 300 and each of its individual functions, routines, subroutines, or operations may be performed by one or more processing devices of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by non-persistent mode component 116 executed by one or more processing devices of the client device 110.

Method 300 may begin at block 302. At block 302, a processing device executing a non-persistent mode component 116 may receive a selection to activate a non-persistent mode for the network manager 112 of the client device 110. As discussed above, the non-persistent mode may prevent tracking of specific times or locations of the client device 110 accessing one or more of the networks 128. In one example, the selection may be received via a user interface of the network manager 112 that is displayed on a display of the client device 110. In another example, the selection may be received from another application being executed by the processing device on the client device 110. Such an application may include an Internet browser, for example, that enters its own type of non-persistent mode selected by the user. The non-persistent mode of the application is different than the non-persistent mode of the network manager 112 described herein. The user selecting the browser's non-persistent mode may trigger the browser to send a signal to the non-persistent mode component 116 to activate the network manager's non-persistent mode. In an example, the selection to enter the non-persistent mode of the network manager 112 may be received prior to any operations are performed to establish a network connection, such as searching for available networks 128 and/or connecting to a network 128, among others.

In some examples, a prompt may be displayed via a GUI of the network manager 112 in response to receiving the selection to activate the non-persistent mode. The prompt may present one or more selectable options via a user interface of the network manager 112. The selectable options may include a first option to store information revealing a network connection in the non-persistent memory 120 of the client device 110 while in the non-persistent mode, and a second option to not store the information revealing the network connection in any memory of the client device. Selecting the first option causes the information to be stored in the non-persistent memory 120, and selecting the second option causes the information to be deleted without being stored in any memory. At block 304, the processing device executing the non-persistent mode component 116 may activate the non-persistent mode for the network manager 112.

When a network connection establishing operation is performed, the processing device may determine whether the non-persistent mode is activated for the network manager 112, and if so, ensure that no network related information is stored in the persistent memory 118. For example, at block 306, while the non-persistent mode is activated for the network manager 112, the processing device may receive a request to connect to a network 128. The request may be received as a result of a user activating network connectivity (e.g., WiFi) of the client device 110.

At block 308, while the non-persistent mode is activated for the network manager 112 and in response to the request to connect to a network 128, the processing device may cause the network manager 112 to perform a set of operations to establish a connection with a network 128. The set of operations excludes storing information revealing the network connection in the persistent memory 118 of the client device 110. In some examples, the information revealing the network connection may be stored in the non-persistent memory 120 if selected by the user, as discussed above.

In addition, the set of operations may include searching for a list of available networks 128 in an area where the client device 110 is physically located. Searching for the list of available networks 128 may include the network manager 112 instructing the NIC 114 to receive any messages being broadcast by the network providers 1, 2, and/or N and/or the network device 210. The network manager 112 may extract information (e.g., service set identifier (SSID), address, geographical location) related to the networks 128 that is included in the received messages and use the SSIDs to populate the list of available networks 128.

A user interface of the network manager 112 may display the list of available networks 128. The set of operations may further include receiving a selection to connect to one of the available networks 128 from the list using a connection password entered by the user or stored in the non-persistent memory 120. For example, if the connection between the client device 110 and a network 128 is dropped and the user has selected to store the network related information in the non-persistent memory 120, then the network manager 112 may retrieve the connection password and the selected network information (e.g., address, SSID, etc.) from the non-persistent memory 120 to reestablish the connection.

Further, the set of operations may include authenticating the client device 110 with the selected network 128 using the connection password and/or a username. The set of operations may also include establishing the connection between the client device 110 and the selected network 128 upon successful authentication. In some examples, the set of operations may also include disabling network connection event logging to a system log to further ensure that the information revealing the network connection are not stored in the persistent memory 118.

The information revealing the network connection may include one or more of the list of available networks 128 (e.g., SSIDs) that is found as a result of searching, addresses of the available networks, the connection password for the selected network 128, timestamps of when connections are attempted, established, and disconnected, and/or geographical location information of the client device 110 and the networks 128. If the information is being stored in the non-persistent memory 120, the information may be stored until a certain event occurs. Example events that cause the non-persistent memory 120 to erase the information revealing the network connection may at least include rebooting of the client device 110, receiving a selection to deactivate the non-persistent mode, receiving a selection to lock an operating system of the client device 110, receiving a selection to switch users of the operating system of the client device 110, receiving a selection to log off a session of the operating system, and completing authentication of the client device 110 on a selected network 128.

Figure 4:
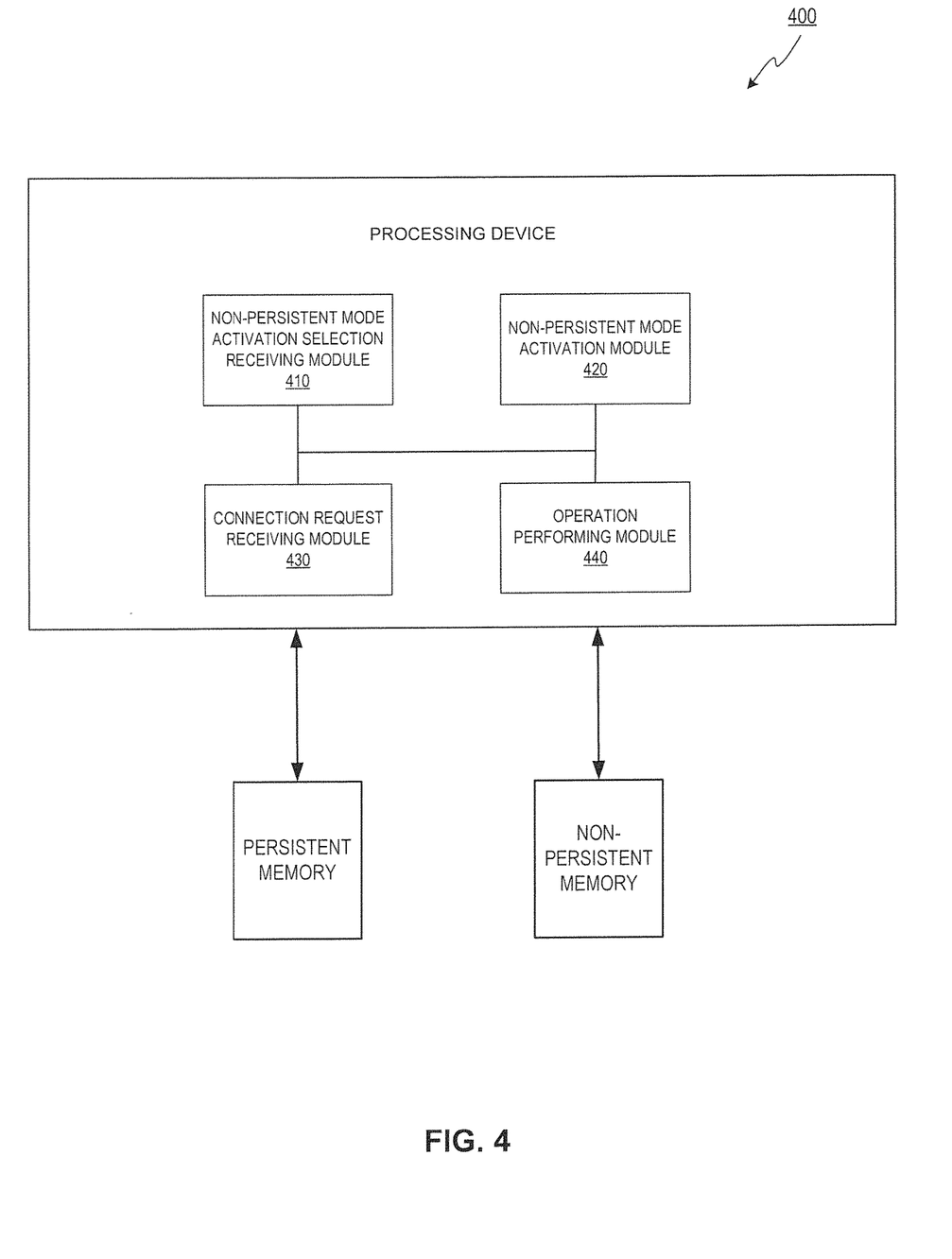
FIG. 4 depicts a block diagram of an example computer system in accordance with one or more aspects of the present disclosure.

FIG. 4 depicts a block diagram of an example computer system 400 in accordance with one or more aspects of the present disclosure. Computer system 400 may be the same or similar to the client device 110 and may include one or more processing devices and one or more memory devices. In the example shown, computer system 400 may include non-persistent mode activation selection receiving module 410, non-persistent mode activation module 420, connection request receiving module 430, and operation performing module 440.

Non-persistent mode activation selection receiving module 410 may instruct the processing device to receive a selection to activate the non-persistent mode of the network manager 112. The selection may be received from a user interface of the network manager 112 or may be received from another application (e.g., browser). In one example, the selection to activate the non-persistent mode may be received prior to any network connection events occurring (e.g., searching for a network 128, connecting to a network 128, etc.). In another example, a browser may be instructed to enter its own non-persistent mode, which may cause the application to send the selection to the processing device to activate the non-persistent mode for the network manager 112.

Additionally, a prompt may be displayed via a GUI of the network manager 112 in response to receiving the selection to activate the non-persistent mode. The prompt may present the one or more selectable options via the user interface of the network manager 112. The selectable options may include storing the information revealing the network connection in the non-persistent memory 120 or not storing information revealing the network connection in any memory. Selecting the first option causes the information to be stored in the non-persistent memory 120, and selecting the second option causes the information to be deleted without being stored in any memory. In some examples, the non-persistent mode may include a default setting to store the information in the non-persistent memory 120.

Non-persistent mode activation module 420 may instruct the processing device to activate the non-persistent mode for the network manager 112. If the user selected to store the information in the non-persistent memory 120, then activating the non-persistent mode may cause the information revealing the network connection to be stored in the non-persistent memory 120 from the point in time when the non-persistent mode is activated. Similarly, if the user selected to not store the information in any memory, then activating the non-persistent mode may cause the information revealing the network connection to be deleted without being stored in any memory from the point in time when the non-persistent mode is activated.

Connection request receiving module 430 may instruct the processing device to receive a request to connect to a network 128. In an example, the request may be received as a result of the user enabling network connectivity on the client device 110. For example, the user may turn on WiFi capability of the client device 110.

Operation performing module 440 may instruct the processing device, while the non-persistent mode is activated for the network manager 112 to perform a set of operations to establish a network connection. The set of operations exclude storing information revealing the network connection in the persistent memory 118. The set of operations may also include searching for a list of available networks 128 in an area where the client device 110 is physically located, receiving a selection to connect to an available network 128 from the list using a connection password, authenticating the client device 110 with the selected network 128 using the connection password, and/or establishing the connection between the client device 110 and the selected network 128 upon successful authentication. The information obtained by the client device 110 during the set of operations is stored in the non-persistent memory 120 if the user selected to store the information in the non-persistent memory 120. If the user selected to not store the information revealing the network connection, then the information is deleted immediately without being stored.

Figure 5:
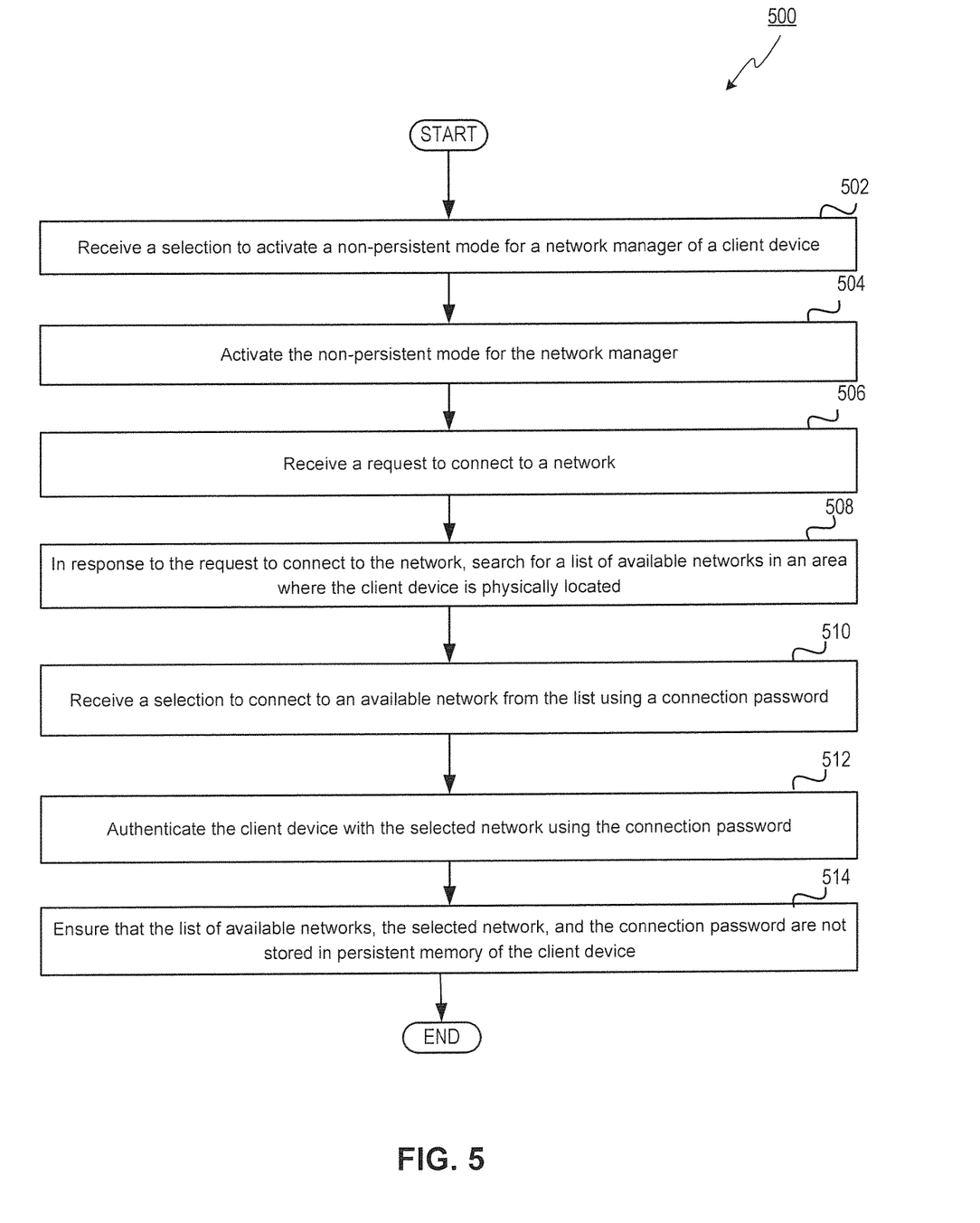
FIG. 5 depicts a flow diagram of another example method for activating a non-persistent mode for a network manager that enhances privacy for network connections, in accordance with one or more aspects of the present disclosure.

FIG. 5 depicts a flow diagram of another example method 500 for activating the non-persistent mode for the network manager 112 that enhances privacy for network connections, in accordance with one or more aspects of the present disclosure. Method 500 may be similar to method 300 and may be performed in the same or a similar manner as described above in regards to method 300. Method 500 may be performed by processing devices of a client device and may begin at block 502.

At block 502, a processing device may receive a selection to activate the non-persistent mode for the network manager 112. The selection may be received from a user interface of the network manager 112 or from another application being executed by the processing device. For example, another application may include a browser and the browser sends the selection in response to an instruction to activate its own non-persistent mode. Further, the selection may also include an indication that the user desires any information revealing a network connection to be stored in the non-persistent memory 120 or to not be stored in any memory.

If the user selects to store the information revealing the network connection in the non-persistent memory 120, the information may be stored in the non-persistent memory 120 until a certain event occurs. For example, the event may include rebooting the client device 110, locking an operating system of the client device 110, completing authentication of the client device 110 with the network 128, deactivating the non-persistent mode, logging off the operating system, switching users of the operating system, and the like. Also, the selection to activate the non-persistent mode may be received prior to the processing device performing any network connection related events, such as searching for available networks 128 or connecting to a selected network 128.

At block 504, the processing executing the non-persistent mode component 116 may activate the non-persistent mode for the network manager 112. At block 506, the processing device may receive a request to connect to a network 128. In some examples, the request may be received as a result of network connectivity being enabled on the client device 110.

At block 508, in response to the request to connect to the network 128, the processing device may search for a list of available networks 128 in an area where the client device 110 is physically located. The processing device may cause the network manager 112 to instruct the NIC 114 to receive messages broadcasted by the network device 210 and/or the network providers 1, 2, and N. The processing device may extract a list of SSIDs of available networks 128 and present the list of available network SSIDs to the user on a display of the client device 110.

At block 510, the processing device may receive a selection to connect to an available network 128 from the list using a connection password. The user may select the available network based on signal strength or any other suitable criterion. Further, the user may select the available network and may enter the connection password using any suitable input peripheral (e.g., mouse, keyboard, microphone, touchscreen, etc.).

At block 512, the processing device may authenticate the client device 110 with the selected network 128 using the connection password. Upon successful authentication, a connection may be established between the client device 110 and the selected network 128. At block 514, the processing device ensures that certain network connection information (e.g., the list of available networks, the selected network, and the connection password) are not stored in the persistent memory 118 of the client device 110. Additional information that the processing device ensures is not stored in the persistent memory 118 may include geographical information related to the list of networks 128, addresses of the networks 128, timestamps of when the connection is attempted, established, or disconnected, and the like. Further, based on a selection by the user or a default setting, ensuring that the information is not stored in the persistent memory 118 may include storing the information in the non-persistent memory 120. In another example, ensuring that the information is not stored in the persistent memory 118 may include disabling connection event logging to a system log.

Figure 6:
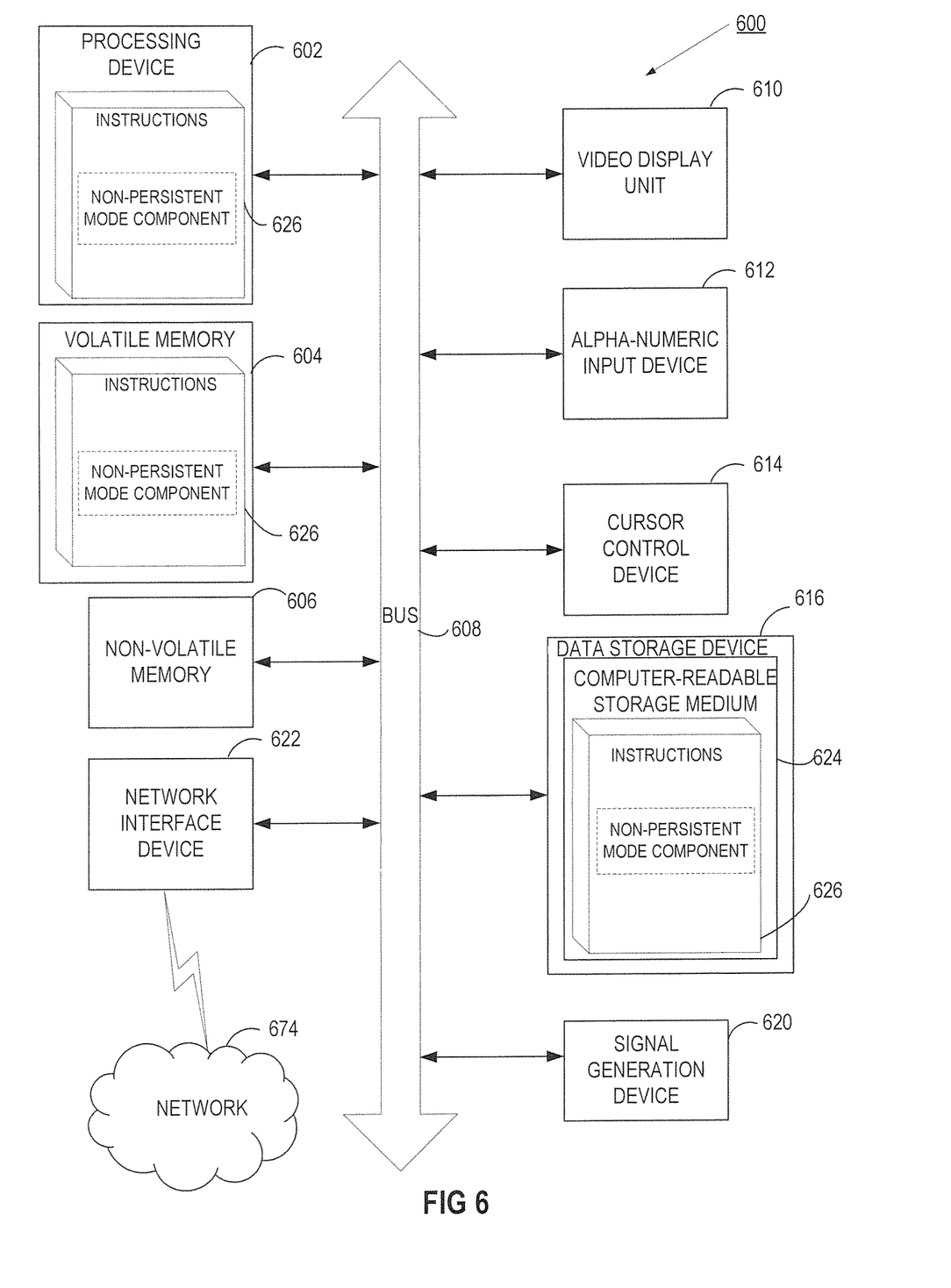
FIG. 6 depicts a block diagram of an illustrative computing system operating in accordance with the examples of the present disclosure.

FIG. 6 depicts a block diagram of an illustrative computing system 600 operating in accordance with the examples of the present disclosure. In various illustrative examples, computer system 600 may correspond to the client device 110 of FIG. 1. In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., the non-persistent memory 120, such as random access memory (RAM)), a non-volatile memory 606 (e.g., the persistent memory 118, such as read-only memory (ROM) or electrically-erasable programmable ROM (EEPROM)), and a data storage device 616, which may communicate with each other via a bus 608. As discussed above, in some examples, while the non-persistent mode is activated for the network manager 112, the information revealing a network connection may be stored in the volatile memory 604 or may not be stored in any memory.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. In an example, the network interface device 622 may include the network interface controller (NIC) 114. Computer system 600 also may include a video display unit 610 (e.g., an LCD, plasma, etc.), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding non-persistent mode component 116, the network manager 112, and/or other components and modules illustrated in FIGS. 1-3.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "causing," "initiating," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or 500 and each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving a selection to activate a non-persistent mode for a network manager of a client device to exclude storing trace information of a connection with a network in a persistent memory of the client device, wherein the selection to activate the non-persistent mode is received from an application instructed to operate in a non-persistent mode that is different from the non-persistent mode for the network manager, or received from a user interface of the network manager on the client device, and wherein the trace information of the connection with the network comprises one or more of a list of available networks, addresses of the available networks, a connection password for a selected network, or timestamps of when a connection is attempted, established, or disconnected;
    activating the non-persistent mode for the network manager prior to establishing the connection with the network; and
    while the non-persistent mode is activated for the network manager:
    receiving a request to connect to the network; and
    performing, via the network manager, a set of operations to establish the connection with the network, the set of operations excluding storing trace information of the connection with the network in the persistent memory of the client device.

2. The method of claim 1, wherein the trace information of the connection with the network is stored in a non-persistent memory of the client device.

3. The method of claim 2, wherein performing the set of operations comprises:
    in response to the request to connect to the network, searching for a list of available networks in an area where the client device is physically located;
    receiving a selection to connect to an available network from the list using a connection password; and
    authenticating the client device with the selected network using the connection password.

4. The method of claim 3, wherein the trace information of the connection with the network further comprises geographical location information of the client device, the selected network, or both.

5. The method claim 4, further comprising, upon the connection being lost, reestablishing the connection with the selected network using at least the connection password for the selected network stored in the non-persistent memory.

6. The method of claim 2, further comprising erasing the trace information of the connection with the network from the non-persistent memory responsive to an event comprising one of:
    rebooting of the client device;
    receiving a selection to deactivate the non-persistent mode;
    receiving a selection to lock an operating system of the client device;
    receiving a selection to switch users of the operating system of the client device;
    receiving a selection to log off a session of the operating system; or
    completing authentication of the client device on a selected network.

7. The method of claim 1, wherein the non-persistent mode prevents tracking of network locations accessed by the client device.

8. A system comprising:
a persistent memory;
a non-persistent memory; and
a processing device operatively coupled to the persistent memory and the non-persistent memory, the processing device to:
receive a selection to activate a non-persistent mode for a network manager, the non-persistent mode preventing tracking of network locations accessed by the system and excluding storing trace information of a connection with a network in the persistent memory of a client device, wherein the selection to activate the non-persistent mode is received from an application instructed to operate in a non-persistent mode that is different from the non-persistent mode for the network manager, or received from a user interface of the network manager on the client device, and wherein the trace information of the connection with the network comprises one or more of a list of available networks, addresses of the available networks, or a connection password for a selected network;
activate the non-persistent mode for the network manager prior to establishing the connection with the network; and
while the non-persistent mode is activated for the network manager:
receive a request to connect to the network; and
perform a set of operations to establish a connection with the network, the set of operations excluding storing trace information of the connection with the network in the persistent memory of the client device.

9. The system of claim 8, wherein the trace information of the connection with the network is stored in the non-persistent memory.

10. The system of claim 9, wherein to perform the set of operations the processing device is further to:
in response to the request to connect to the network, search for a list of available networks in an area where the system is physically located;
receive a selection to connect to an available network from the list using a connection password; and
authenticate the system with the selected network using the connection password.

11. The system of claim 10, wherein the trace information of the connection with the network further comprises geographical location information of the system, the selected network, or both.

12. The system of claim 11, wherein the processing device is further to, upon the connection being lost, reestablishing the connection with the selected network using at least the connection password for the selected network stored in the non-persistent memory.

13. The system of claim 9, wherein the processing device is further to erase the trace information of the connection with the network from the non-persistent memory responsive to an event comprising one of:
rebooting of the system;
receiving a selection to deactivate the non-persistent mode;
receiving a selection to lock an operating system of the system;
receiving a selection to switch users of the operating system of the system;
receiving a selection to log off a session of the operating system; or
completing authentication of the system on a selected network.

14. The system of claim 8, wherein the processing device is further to present one or more selectable options via a user interface responsive to receiving the selection to activate the non-persistent mode, wherein the one or more selectable options comprise:
a first option to store the trace information of the connection with the network in the non-persistent memory while in the non-persistent mode; and
a second option to not store the trace information of the connection with the network in any memory of the system.

15. A non-transitory machine-readable storage medium storing instructions that cause a processing device to:
receive a selection to activate a non-persistent mode for a network manager of a client device to exclude storing information revealing a connection with a network in a persistent memory of the client device, wherein the selection to activate the non-persistent mode is received from an application executing via the processing device upon the application being instructed to operate in a different non-persistent mode than the non-persistent mode for the network manager;
activate the non-persistent mode for the network manager prior to establishing the connection with the network;
receive a request to connect to the network;
in response to the request to connect to the network, search for a list of available networks in an area where the client device is physically located;
receive a selection to connect to an available network from the list using a connection password;
authenticate the client device with the selected network using the connection password;
perform a set of operations to establish a connection with the network, the set of operations excluding storing information;
cause a connection between the client device and the selected network to be established by performing a set of operations, wherein the set of operations excludes storing the list of available networks, the selected network, and the connection password in persistent memory of the client device.

16. The non-transitory machine-readable storage medium of claim 15, wherein the processing device is further to store the list of available networks, the selected network, and the connection password in non-persistent memory.

17. The non-transitory machine-readable storage medium of claim 15, wherein the selection to activate the non-persistent mode is received from an application executing via the processing device upon the application being instructed to operate in a different non-persistent mode than the non-persistent mode for the network manager.

18. The non-transitory machine-readable storage medium of claim 15, wherein ensuring that the list of available networks, the selected network, and the connection password are not stored in persistent memory of the client device comprises the processing device at least disabling connection event logging.

* * * * *